Sept. 20, 1966  J. C. MOORE  3,273,577
METHOD AND APPARATUS FOR DAMPING A PULSATING FLOW OF LIQUID
Filed June 18, 1964

INVENTOR.
John C. Moore

BY Burton Rodney
ATTORNEY

United States Patent Office 3,273,577
Patented Sept. 20, 1966

3,273,577
METHOD AND APPARATUS FOR DAMPING A PULSATING FLOW OF LIQUID
John C. Moore, Lake Jackson, Tex., assignor to The Dow Chemical Company, Midland, Mich., a corporation of Delaware
Filed June 18, 1964, Ser. No. 376,133
5 Claims. (Cl. 137—13)

This invention relates to damping of a pulsating flow of liquid and more particularly is concerned with a method and apparatus utilizing a bellows arrangement for damping a pulsating flow of liquid.

In pumping a liquid into a passageway having a relatively small cross sectional area (e.g. a chromatographic column) in comparison to the volume of liquid trying to enter therein, a natural resistance is built up in the passageway of the column against the flow of comparatively large volumes therethrough. A pump delivering liquid under pressure to said column acts against the resistance to flow of the column by producing surges of pressure or a pulsating flow in said liquid. It is to the damping of these surges of pressure or pulsations in said liquid flow that the instant invention is directed.

In the past, fluid-filled chambers or surge tanks have been used in combination with a pump and a narrow passageway to attenuate surges of pressure or pulsations in the flow of liquids pumped to a narrow passageway. However, these surge tanks when used alone to dampen pulsating liquid flow, suffer from at least one of the following disadvantages:

(1) Any entrapped gas volume in the surge tank is subject to gradual loss by dissolution in the liquid flow unless pressures are not appreciably above ambient.

(2) The release of such dissolved gas into the packing of a liquid chromatographic column causes channelling in the column thereby seriously impairing its resolving power.

Spring loaded surge control devices have also been used to dampen pulsating liquid flow. In these spring loaded surge control devices a spring acts against the outside of a shock absorbing device while liquid being pumped to a column flows inside the shock absorbing device. The pulsating flow was damped or compensated for by the action and reaction of the spring. Many disadvantages were observed using the old spring loaded surge control device. It could only be used over a narrow pressure range, e.g. 5 to 25 p.s.i.g. Different pressure ranges required different spring and shock absorber combinations. The great mechanical stress on the shock absorber itself due to the internal pressure acting thereon, limited the useful life of such a surge control combination.

The disadvantages of the prior art devices have now been overcome by the instant invention for substantially eliminating pulsating liquid flow in a passageway.

It is a principal object of the instant invention to provide a method of and apparatus for damping the pulsating flow of a liquid using a bellows arrangement to provide the damping effect.

Another object is to provide a method of and apparatus for damping a pulsating flow of a liquid which can be used over a wide pressure range.

It is a further object to provide a method of and apparatus for damping a pulsating flow of liquid to a chromatographic column wherein a bellows arrangement acts as a damper to surges of pressure produced by a pump acting against the resistance of flow of the column.

These and other objects and advantages of the present invention will become apparent from the detailed description thereof presented hereinafter in conjunction with the accompanying drawings wherein.

In general the instant invention comprises a sealed bellows arrangement containing a substantially incompressible liquid in a volume about equal to the total volume of the bellows at its mechanical compression limit and a gas substantially insoluble in said liquid, said gas being in a volume about equal to the difference between the volumes of the bellows at its mechanical compression and extension limits, said bellows being immersed in a liquid-filled chamber, the chamber being intermediate to and connected to a pump and a small diametered passageway, e.g. a column receiver.

In carrying out the method of the instant invention using the apparatus as described hereinbefore, the sealed bellows arrangement containing a substantially incompressible liquid and insoluble gas is completely immersed in the liquid-filled chamber. A flow of liquid is then transmitted by the pump to said chamber. The flow of liquid enters said liquid-filled chamber containing said bellows. The bellows acts as a damper and thereby eliminates surges of pressure produced by the pump acting against the resistance of liquid flow of said column. Thus a dampened flow of liquid is then transmitted from said chamber to said column.

Figure 2:
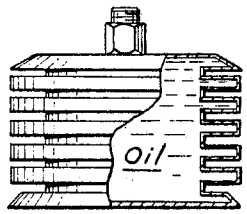
FIGURE 2 is a side view, partly in section, of a sealed bellows arrangement in a compressed state as is used in the instant invention.
Figure 3:
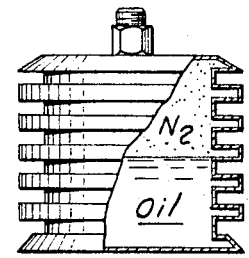
FIGURE 3 is a side view, partly in section, of a sealed bellows arrangement in an extended state as used in the instant invention.
Figure 4:
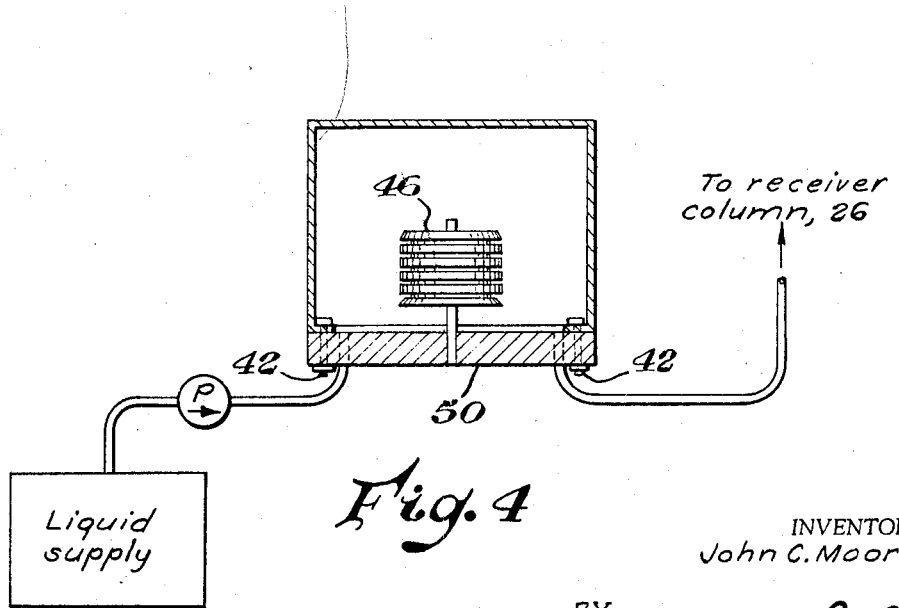
FIGURE 4 is a schematic drawing of another embodiment of the apparatus of the instant invention.

Referring to the figures in more detail wherein like numerals represent like parts in the several views, these show an embodiment of the present invention for damping a pulsated flow of liquid to a column receiver which includes a liquid supply 10 connected via conduit 14 to pump 18. A chamber or reservoir 22 filled with the liquid to be pumped and having closure 38 bolted thereto by bolt 42 is connected in series with intermediate pump 18 and column receiver 26 by conduits 30 and 34 respectively, as shown. A sealed bellows arrangement 46 containing a substantially incompressible oil in a volume about equal to the total volume of the bellows at its mechanical compression limit (FIGURE 2) and nitrogen, said nitrogen being in a volume about equal to the difference between the volumes of the bellows at its mechanical compression and extension limits (FIGURE 3), is completely immersed in said chamber 22 and is allowed to float freely as in FIGURE 1 or is fastened to the chamber wall 50 as in FIGURE 4. At no time are the bellows in direct communication with said pump or column receiver.

The bellows arrangement is prepared for use herein as follows: A substantially incompressible liquid is introduced into said bellows in a volume about equal to the total volume of the bellows at its mechanical compression limit (see FIGURE 2). A gas which is substantially insoluble in said incompressible liquid is next introduced into said bellows in a volume about equal to the difference between the volumes of the bellows at its mechanical compression and extension limits (see FIGURE 3). This gas is at about atmospheric pressure at the extended limit of the bellows.

Substantially incompressible liquids which can be used to fill said bellows while at its mechanical compression limit include, for example, oil, water, fluorocarbon liquids and organic solvents.

Gases to be used to substantially completely fill said bellows should be relatively insoluble in and unreactive with said incompressible liquid. Gases which are relatively inert and insoluble in the liquids noted above are, for example, nitrogen, argon, helium, hydrogen and neon.

A column receiver which can be used in the instant invention should have a passageway therein with a relatively small cross sectional area as compared to the volume of liquid to be pumped into said passageway. Thus, the column receiver can be further characterized as being resistant to the entrance of liquid flow therein.

In the instant invention the bellows arrangement immersed in the liquid-filled chamber can be used to dampen pulsating flow over a wide pressure range, e.g. from about 5 to about 600 p.s.i.g. The working pressure range is limited only by the ratio of pump stroke to compressed gas volume and by the strength of the chamber containing the bellows. In addition, the external pressure of said bellows is always equal to the internal pressure of said bellows, producing little or no mechanical stress of the bellows itself. The bellows in the instant invention in conjunction with a column have a longer and more efficient work capacity than did the spring loaded surge control device described hereinbefore.

The present invention finds particular utility when applied to the damping of a pulsating flow of liquid to a chromatographic column. The instant method and apparatus can be used over a wide range of pressures (e.g. 5-600 p.s.i.g.) over a long working life.

The following example serves to further illustrate the instant invention and its utility when applied to damping a pulsating flow of liquid to a chromatographic column but is in no way meant to limit it thereto.

*Example I*

Figure 1:
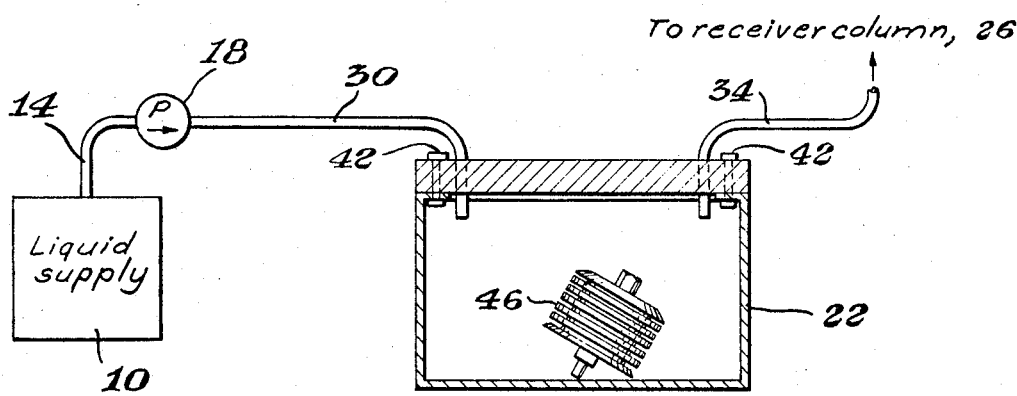
FIGURE 1 is a schematic drawing of one embodiment of the apparatus of the instant invention.

An apparatus including a chromatographic column was assembled as shown in FIGURE 1. A simple reciprocating plunger type pump was connected to a supply of tetrahydrofuran and in turn was connected to a chamber in the form of a cylinder which was 4 inches in diameter and 6 inches in length. A sealed bellows arrangement of about 1¼ inches in diameter and about 1¼ inches in thickness when extended, was provided containing about 4 milliliters of oil and about 10 milliliters of nitrogen at atmospheric pressure when said bellows were extended. The chamber was filled with tetrahydrofuran and the bellows were immersed in the tetrahydrofuran in said chamber. A packed chromatographic column about ⅜ inches in diameter and about 20 feet long was connected via a conduit to said chamber. The pump was started and the tetrahydrofuran pumped under 70 pounds per square inch gauge pressure, flowed smoothly, as noted from visual observation, without pulsations to said chromatographic column.

When the sealed bellows were removed from the chamber and pumping resumed the flow of tetrahydrofuran to the chromatographic column was observed to be a pulsating flow.

Thus it can be seen that the novel use of the bellows had a material and decisive effect in damping the pulsating flow of tetrahydrofuran to said column.

Various modifications can be made in the instant invention without departing from the spirit or scope thereof, for it is to be understood that I limit myself only as defined in the appended claims.

What is claimed is:

1. A method of damping a pulsating flow of liquid which includes providing a liquid supply, a column receiver for said liquid, a pump for transmitting a flow of said liquid to said column receiver, said column receiver being chacacterized as being resistant to liquid flow therein, and said pump being characterized as producing surges of pressure in said liquid flow when said pump acts against the resistance to flow of said column, and a chamber filled with said liquid, connected in series with and intermediate said pump and column, the improvement which comprises:

(a) providing a sealed bellows arrangement; containing a substantially incompressible liquid in a volume about equal to the total volume of the bellows at its mechanical compression limit and a gas which is substantially insoluble in said incompressible liquid in a volume about equal to the difference between the volumes of the bellows at its mechanical compression and extension limits, said gas being at about atmospheric pressure at the extended limit of said bellows;

(b) completely immersing the sealed bellows in said liquid-filled chamber;

(c) transmitting a flow of liquid from said pump to said chamber;

(d) allowing said flow of liquid to enter said liquid-filled chamber containing said bellows, said bellows thereby acting as a damper and eliminating surges of pressure produced by the pump acting against the resistance to liquid flow of said column; and (e) transmitting a dampened flow of liquid from said chamber to said receiver.

2. In a method of damping a pulsating flow of liquid to a chromatographic column which includes providing a liquid supply, a chromatographic column, a pump for transmitting a flow of said liquid to said column, said column being characterized as being resistant to liquid flow therein, and said pump being characterized as producing surges of pressure in said liquid flow when said pump acts against the resistance to flow of said column, and a chamber filled with said liquid connected in series with and intermediate said pump and column, the improvement which comprises:

(a) providing a sealed bellows arrangement containing a volume of a substantially incompressible liquid being about equal to the total volume of the bellows at its mechanical compression limit and a volume of gas which is substantially insoluble in said incompressible liquid, said volume being about equal to the difference between the volumes of the bellows at its mechanical compression and extension limits, said gas being at about atmospheric pressure at the extended limit of the bellows;

(b) completely immersing said sealed bellows in said liquid-filled chamber;

(c) transmitting a flow of liquid from said pump into said chamber;

(d) allowing said flow of liquid to enter said liquid-filled chamber containing said bellows, said bellows thereby acting as a damper and eliminating surges of pressure produced by the pump acting against the resistance to fluid flow of said chromatographic column; and (e) transmitting a dampened flow of liquid to said column.

3. The method in accordance with claim 2 wherein said incompressible liquid is oil and said insoluble gas is nitrogen.

4. In an improvement in a chromatographic column apparatus which includes a liquid supply, chromatographic column, and a pump to provide a flow of said liquid to said column, said column being characterized as being resistant to liquid flow therein, said pump being characterized as producing surges of pressure in said fluid flow when said pump acts against the resistance to flow of said column and a chamber filled with said liquid, said chamber connected in series with and intermediate said pump and said chromatographic column, the improvement which comprises: a sealed bellows arrangement immersed in said liquid-filled chamber, said bellows being filled with a volume of a substantially incompressible liquid being equal to the total volume of the bellows at its mechanical compression limit, and a volume of gas substantially insoluble in said liquid being equal to the difference between the volumes of the bellows at its mechanical compression and extension limits, said gas being at about atmospheric pressure at the extended limit of the bellows.

5. The apparatus in accordance with claim 4 wherein said incompressible liquid is oil and said insoluble gas is nitrogen.

References Cited by the Examiner
UNITED STATES PATENTS

| | | | |
|---|---|---|---|
| 2,385,316 | 9/1945 | Walton | 137—155 |
| 2,811,925 | 11/1957 | Crookston | 138—30 |
| 2,902,989 | 9/1959 | Rippingille | 138—30 |
| 2,904,077 | 9/1959 | Trumper | 138—30 |

M. CARY NELSON, *Primary Examiner.*

W. CLINE, *Assistant Examiner.*